Nov. 11, 1969  B. N. ARMATO  3,477,133
MUSICAL INSTRUMENT REED MEASURING DEVICE AND METHOD
FOR ADJUSTING REEDS
Filed April 16, 1968
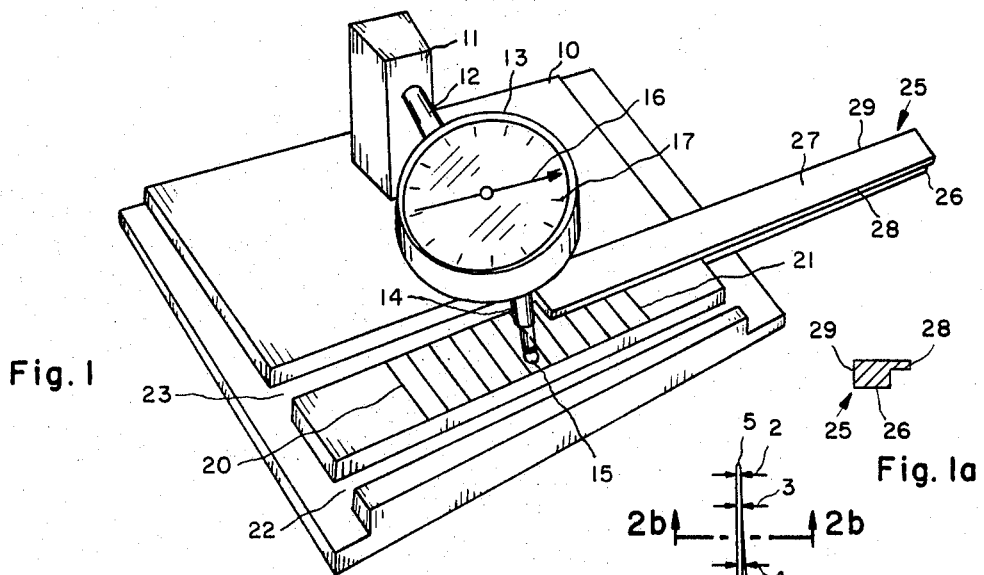
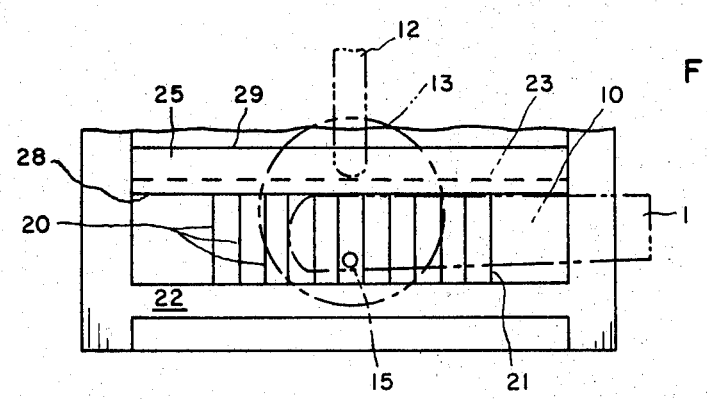
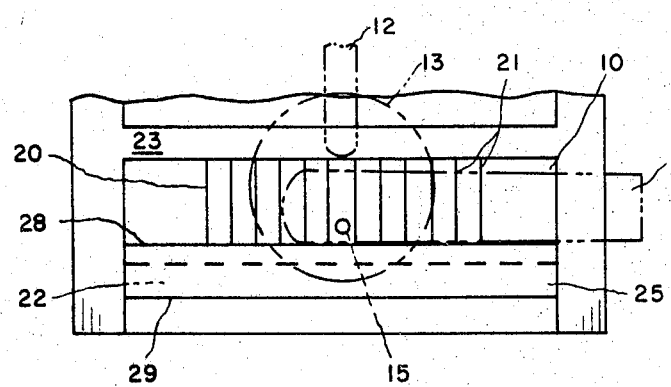
INVENTOR.
B. N. ARMATO
BY
ATTORNEY United States Patent Office 3,477,133
Patented Nov. 11, 1969

3,477,133
MUSICAL INSTRUMENT REED MEASURING DEVICE AND METHOD FOR ADJUSTING REEDS
Ben N. Armato, 17 Sherbrooke Road,
Hartsdale, N.Y. 10530
Filed Apr. 16, 1968, Ser. No. 721,764
Int. Cl. G01b 5/00, 3/22
U.S. Cl. 33—147                    12 Claims

ABSTRACT OF THE DISCLOSURE

A device for comparing or measuring the thickness along transverse sections of a musical instrument reed to determine any unbalance, after which the higher side can be scraped down to balance the reed and make it playable. The device uses a dial indicator as a height sensor, and a movable reference surface on a base with indicia to allow different areas of the reed to be compared.

---

This invention relates to a device useful for adjusting musical instrument reeds to vibrate and play freely.

One of the difficulties encountered by single-reed, wind instrument musicians (clarinet, saxophone) is to obtain a reed that vibrates and plays freely. The best reeds are made from cane and comprise flat slivers with a slightly rounded top surface and a tapered end constituting the vibrating or playing end. As obtained from reed suppliers they are usually unsuitable for playing because they do not vibrate freely. Most experienced musicians use what is called a reed knife for scraping the tapered reed end until, by trial and error, they obtain a reed which performs satisfactorily. The more experienced the musician, the easier it is for him by this trial and error process to arrive at a reed construction that is satisfactory, though it is a burdensome and time-consuming chore. Less experienced musicians, and especially students, find this an extremely difficult and onerous task, as well as expensive, because it may require scraping of several reeds before a suitable one is achieved. Moreover, it is rarely reproducible.

My present invention provides an indicating or measuring device that readily enables both skilled and unskilled persons to measure the important parameters of the reed and rapidly determine which areas require modification to obtain a playable reed. It is based on my recognition that the reed taper should be balanced for most players, and comparing or measuring its thickness along lines spaced the same distance from its side edges, and then scraping to make the thickness uniform (or selectively non-uniform to obtain a particular kind of sound) will produce a satisfactory reed that plays well.

A feature of the indicating device of my invention is provision of a reference surface against which the reed may be positioned while on a base to enable its thickness to be compared or measured selected distances in from the side edges. A further feature is the presence of indicia on the device base for locating corresponding points of the reed spaced the same distance from the end. Still another feature is the use of a dial indicator supported over the device base as the thickness measuring or comparing means.

These and further objects and advantages of the invention will best be understood with reference to the following detailed description of a preferred embodiment of my invention, taken in conjunction with the accompanying drawing wherein: FIG. 1 is a perspective view of one form of reed measuring device in accordance with my invention; FIG. 1a is a cross-section of the reference bar; FIG. 2a is a side view, FIG. 2b is a cross-sectional view along the line 2b—2b, and FIG. 2c a top view of a typical reed; FIG. 3 is a partial top view of the device shown in FIG. 1 with the dial in phantom to expose the base surface and with a reed in measuring position; FIG. 4 is a view similar to FIG. 3 for measuring a different part of the reed.

My device is useful for adjusting reeds for all single-reed instruments, such as Bb, A, C, Eb clarinets; Bb bass clarinet; basset-horn; and Eb, Bb, C saxophones. As mentioned earlier, the best reeds are made from cane and in the form obtained from the manufacturer are provided with a tapered end, illustrated in side view in FIG. 2a, the reed being designated 1. The reason why most reeds in this form are not playable—which means that they do not vibrate freely or respond properly or give the proper overtones—appears, as I have found, to be connected with the fact that they are not balanced, i.e., their thickness as measured along the taper, shown at several points in FIG. 2a at 2, 3 and 4, is usually not uniform across the width of the reed, the dimension into the plane of the drawing. My device enables the thickness of transverse sections of the reed to be measured or compared so that the higher side can be located and scraped down to match the opposite or lower side.

In the form illustrated in FIG. 1, my device comprises a flat base member 10 having a rear post 11 which supports a rod 12 on which is mounted a conventional dial indicator 13 of the type commonly used in the machine shop industry. The dial indicator includes a sensing rod 14 with a ball end 15 coupled to a pointer 16 associated with a scale 17. The ball end rests on the base surface, and if pushed up the height of the ball end 15 over the base 10 is indicated by the pointer 16 on the scale 17 usually in thousandths of an inch. The scale is also rotatable to align its zero line with the pointer for any starting position of the ball end. On the base surface are provided a series of indicia in the form of two groups of scribe lines 20, 21 spaced equal distances from one another on opposite sides of the ball end 15. Thus, the ball end is located approximately midway between two of the lines, with five additional lines being provided on each side of the indicator height sensor 14.

The base 10 is also provided with front and rear parallel grooves 22, 23 on opposite sides of the indicator height sensor 14 and extending perpendicular to the scribe lines 20, 21. The grooves, which have the same dimensions, receive a separable L-shaped reference bar member 25, shown in cross-section in FIG. 1a, having a groove receiving portion 26 and a reference surface portion 27 having opposed, parallel reference surfaces 28 and 29.

The device is operated as follows. The reference bar 25 is positioned in the rear groove 23 with the reference surface 28 facing the height sensor 14, as shown in FIG. 3. The scale 17 is rotated until the pointer reads zero with the ball end 15 of the sensor 14 on the base surface 10. A reed is placed with its flat side 30 on the base 10 and positioned against the reference surface 28 with its right edge 31, and then moved until its tip 5 reaches the first scribed line in the group 20 lying on the opposite side of the sensor 14. The geometry of the reference bar 25 and the spacing of the groove 23 to the sensor 14 is such that the ball end 15 is located near the tip 5 and on a point on the tapered part of the reed about 1 mm. in from the end and about 1 mm. in from the left side edge 32. In FIG. 2c the point is designated 33. The dial is read and the reading recorded. Then the reed is pushed inward to the next scribe line, the sensor being then positioned at point 34, and the dial read and recorded, and so on until six readings have been made of the height of the tapered surface over the base at six spaced points along a line 35 about 1 mm. in from the left edge, corresponding to the measurement 6 in FIG. 2b. Then, the reed is removed, turned 180° and replaced on the base surface from the opposite side with its left edge 32 bearing against the reference surface 28, and now the reed pushed under the height sensor 14 using the opposite group 21 of locating scribe lines and the measurements repeated, producing a set of six sensor heights of the tapered surfaces along a line 36 about 1 mm. in from the right edge, corresponding to the measurement 7 in FIG. 2b. The horizontal dashed lines in FIG. 2c correspond to the ball positions at the scribe lines and their intersections with the vertical lines 35 and 36 show the reading points located on the six transverse reed sections. The two sets of readings are compared to ascertain the higher readings or higher side. Next using a reed knife or like scraping tool, such as a file or razor, the higher side is scraped off. Then the readings can be repeated, and the scraping repeated until the right and left side tapers have about the same thickness, producing a playable reed.

Even better reeds are obtained by repeating the readings along lines 38 spaced about 4 mm. in from the side edges. For this purpose, the reference bar 25 is removed from the rear groove and placed in the front groove 22 with the reference surface 28 again facing the height sensor 14 as shown in FIG. 4. The ball 15 is off-center between the two grooves, and the spacing of the front groove 22 is such that when the reed bears with its side edges against the reference surface, the sensor makes the measurements along a line about 4 mm. in from the edge. If desired, both sets of readings can first be made and then used to determine the extent of scraping necessary to balance the reed.

The advantage of the separable reference bar 25 is to enable two sets of readings to be made along different parts of the reed taper. In the embodiment described, the same reference surface 28 is used for both sets, the different spacings of the grooves to the sensor determining where the reading is taken. It is also possible to use a single groove and construct the reference part 27 of the bar 25 asymmetrically, as shown, so that it has two reference surfaces 28 and 29 located different distances from the groove center. As a result, if the bar is rotated 180° and reinserted in the same groove, then the sensor would be positioned over a different part of the reed surface. Other schemes providing adjustable or fixed references surfaces on the base against which the reed edges are positioned to enable the sensor to measure its thickness will be evident to those skilled in this art and are within the contemplation of my invention. An advantage of having two grooves and the dial indicator located off-center relative to the grooves plus the use of an asymmetric reference bar, as shown, is that the same device is capable of providing proper measurements of different-sized reeds, such as used for the various clarinets, saxophones, etc., by a suitable choice of groove plus reference surface. Similarly, while the indicator is shown as fixed and the reed moved in my preferred embodiment, the opposite arrangement which would fix the reed and allow for movement of the sensor guided by a reference surface relative to the reed is simply an alternate method for accomplishing the same results and also within my contemplation. Also, indicia other than the scribe lines described can be employed to enable the desired comparitive measurements across the width of the reed to be made.

The several parts of the device illustrated can be made of various material, such as metal, wood, or plastic as is well known. The method is applicable not only to cane reeds, but also to reeds made of wood or other materials, e.g., plastic and fiber glass, capable of having material removed to alter its vibration modes.

A dial indicator as the sensor is preferred because it is accurate and sensitive, and because it gives a visual result easily read and recorded by unskilled persons. It will be recognized, however, that it is merely functioning as a device for comparing the height of transverse regions of the reed tapered surface to determine unbalance, and thus any device capable of comparing the height above a surface of two adjacent points and of indicating the higher point can be employed in its stead. In most cases, it is not absolute thickness of the reed that matters so much as the relative unbalance in thickness, and thus the sensor need not indicate real values so long as it will tell which side of the reed is higher. Another advantage, however, of the dial indicator is that the actual thickness can be measured, and once the user has found a reed geometry which is especially satisfactory, he could use the ideal reed measurements as a guide for modifying the shape of a new reed. Still further, certain musicians may prefer a slightly unbalanced reed because of the particular kind of sound developed. The dial indicator allows, for example, one side of the reed to be scraped down to, say, one or two thousandths of an inch above or below the other side and allows such unbalanced reeds to be readily reproduced.

As the reeds supplied by the manufacturer may not have a flat bottom 30, it is preferred, before carrying out the measuring steps above described, to perform certain preliminary steps, as follows. First the bottom surface of the reed should be placed on very fine sandpaper, e.g., no coarser than #600 3M (TRI-M-ITE-A wt.), and sanded down (about 20 strokes) until the bottom is flat. Next, the process is repeated but on a non-abrasive surface capable of polishing and sealing the pores of the cane. I have found a satisfactory surface is paper, which polishes and thus seals the pores. Newsprint also is satisfactory. Both operations should be carried out preferably on plate glass or other flat surface.

It will be plain from the foregoing that my invention provides a novel reed measuring or testing device affording a simple but highly efficient method enabling reed for single-reed instruments to be made with controlled configurations producing well-playing reeds.

While I have described my invention in connection with specific embodiments and applications, other modifications thereof will be readily apparent to those skilled in this art without departing from the spirit and scope of the invention.

What is claimed is:

1. A device for measuring a musical-instrument reed having opposed major surfaces and side edges extending in its elongated direction, comprising a base member for supporting the reed along a major surface, a reference surface on the base member for receiving a side edge of the reed, thickness measuring means mounted over said base and including sensor means extending toward the base for determining the relative height of a point on the reed major surface over the surface of the base, first means on the device for positioning the sensor on corresponding points substantially equally spaced inward from and adjacent the opposite side edges of the reed along a first transverse section of the reed, and at least second means on the device for positioning the sensor on corresponding points substantially equally spaced inward from and adjacent the opposite side edges of the reed along a second transverse section of the reed spaced from the first transverse reed section.

2. A device for measuring a musical-instrument cane single reed as set forth in claim 1 wherein the first sensor-positioning means comprises on the base member first indicia extending substantially perpendicular to the reference surface and spaced from the sensor, and the second sensor-positioning means comprises on the base member second indicia extending substantially perpendicular to the reference surface and spaced from the sensor and from the first indicia.

3. A device as set forth in claim 2 wherein the first and second indicia comprise a first group of substantially equally-spaced parallel lines extending perpendicular to the reference surface and on one side spaced from the sensor, and a second group of substantially equally-spaced parallel lines extending perpendicular to the reference surface and on the opposite side spaced from the sensor, said sensor being located approximately midway between the first and second line groups and being spaced substantially the same distance from corresponding lines in each line group.

4. A portable device as set forth in claim 3 wherein the reference surface comprises a surface spaced from the sensor on a member on the base projecting above the base surface, and the thickness measuring means comprises a dial indicator.

5. A portable device as set forth in claim 4 wherein the reference surface is on one side of the sensor spaced a given distance therefrom, and further including means providing a second reference surface parallel to the first-mentioned reference surface and located on the opposite side of the sensor spaced therefrom a distance different from said given distance.

6. A musical-instrument single-reed measuring device comprising a base member including suporting means having a flat base surface for supporting a reed with its tapered surface facing upward, and means for comparing the thickness along transverse sections of the reed to determine the higher and lower reed sides, said thickness comparing means including at least one groove in the flat surface, a reference member for removable mounting in said groove, said reference member having at least one reference surface for receiving the reed side edges, a dial indicator mounted on the base and extending over the flat surface with its height sensor engaging the said surface adjacent the reference surface, and indicia on the said flat surface for indicating relative positions of the reed, said indicia extending substantially at right angles to the said reference surface.

7. A musical-instrument single-reed measuring device as set forth in claim 6 wherein the reference member has two opposed reference surfaces spaced different distances from the groove center for positioning the reed two different positions relative to the height sensor.

8. A musical-instrument single reed measuring device as set forth in claim 7 wherein the base surface has two parallel grooves spaced different distances from the height sensor, and the reference member has an L-shaped cross-section.

9. A method for improving the playability of a single-reed musical instrument cane reed, comprising measuring the thickness of the reed along a first series of spaced points extending along one side of the reed surface spaced a small distance in from one edge and corresponding to points along spaced transverse sections of the reed, measuring the thickness along a second series of spaced points extending along the opposite side of the reed surface spaced the same small distance in from the opposite side edge, said second series of points lying along the same transverse reed sections as the first series of points, comparing the two series of measurements to determine the thicker side of the reed, and removing material from the said reed surface along the thicker side of the reed until it assumes a thickness bearing a predetermined relation to that along the opposite side of the reed.

10. A method as set forth in claim 9 wherein, after measuring along the first series of points and before measuring along the second series of points, the reed is rotated 180° in the plane of its major surfaces, and material is removed until the thicker side assumes a thickness substantially matching that along the opposite reed side.

11. A method as set forth in claim 9 wherein, before the material removing step, the thickness of the reed is measured along a third series of spaced points extending along said one side of the reed spaced a distance in from said one edge which is larger than that of the first series of spaced points and which correspond to points along the same spaced transverse sections of the reed, and the thickness of the reed is measured along a fourth series of spaced points extending along the opposite side of the reed spaced the same larger distance in from the opposite side edge, said fourth series of points lying along the same transverse sections as the first, second and third series of points, and the four series of measurements are compared to determine the thicker side of the reed.

12. A method as set forth in claim 9 wherein, before the measuring steps, abraiding the bottom surface of the reed to flatten it, and then polishing it to seal the pores.

References Cited

UNITED STATES PATENTS

| | | |
|---|---|---|
| 1,347,207 | 7/1920 | Coats. |
| 1,908,276 | 5/1933 | Aldeborgh. |
| 1,954,233 | 4/1934 | Zimmerman. |
| 2,204,871 | 6/1940 | Strano et al. |
| 2,230,933 | 2/1944 | Caire et al. _____ 84—383 |
| 2,387,852 | 10/1945 | Maloff. |

HARRY N. HAROIAN, Primary Examiner

U.S. Cl. X.R.

33—172